US011403474B2

(12) United States Patent
Kawashima

(10) Patent No.: US 11,403,474 B2
(45) Date of Patent: Aug. 2, 2022

(54) IMAGING METHOD, IMAGING DEVICE, METHOD FOR DISTINGUISHING IMAGING OBJECT, AND STORAGE MEDIUM

(71) Applicant: OPTOELECTRONICS CO., LTD., Warabi (JP)

(72) Inventor: Yasutake Kawashima, Warabi (JP)

(73) Assignee: OPTOELECTRONICS CO., LTD., Warabi (JP)

(*) Notice: Subject to any disclaimer, the term of this patent is extended or adjusted under 35 U.S.C. 154(b) by 0 days.

(21) Appl. No.: 17/315,753

(22) Filed: May 10, 2021

(65) Prior Publication Data

US 2021/0271837 A1 Sep. 2, 2021

Related U.S. Application Data

(63) Continuation of application No. PCT/JP2020/041589, filed on Nov. 6, 2020.

(30) Foreign Application Priority Data

Mar. 2, 2020 (JP) .............................. JP2020-035225

(51) Int. Cl.
*G06K 7/10* (2006.01)

(52) U.S. Cl.
CPC ..... *G06K 7/10752* (2013.01); *G06K 7/10584* (2013.01); *G06K 7/10732* (2013.01)

(58) Field of Classification Search
CPC .......... G06K 7/10584; G06K 7/10732; G06K 7/10752

(Continued)

(56) References Cited

U.S. PATENT DOCUMENTS 9,734,370 B2* 8/2017 Meier ................. G06K 7/10722
2002/0003896 A1 1/2002 Yamazaki
(Continued)

FOREIGN PATENT DOCUMENTS

EP 2482226 A2 8/2012
EP 3285198 A2 2/2018
(Continued)

OTHER PUBLICATIONS

English translation of Written Opinion issued in Intl. Appln. No. PCT/JP2020/041589 dated Feb. 9, 2021, filed May 10, 2021.
(Continued)

*Primary Examiner* — Toan C Ly
(74) *Attorney, Agent, or Firm* — Rossi, Kimms & McDowell LLP

(57) ABSTRACT

An imaging device comprises an imaging sensor and a pulsed LED for illuminating an imaging object of the imaging sensor, performs respective imagings according to respective imaging conditions each including an exposure time te of the imaging sensor and a lighting time tr of the pulsed LED, stores respective combinations of brightness index values D1 of respective images obtained by the respective imagings and the imaging conditions of the respective images, obtains estimates of exposure contribution degree k_off indicating degree of influence of variation of the exposure time te on brightness index value and a lighting contribution degree k_on indicating degree of influence of variation of the lighting time tr on brightness index value, based on the stored combinations of the brightness index values D1 and the imaging conditions, and determines an imaging condition to be used in the next imaging based on the estimates of k_on and k_off.

20 Claims, 6 Drawing Sheets

(58) Field of Classification Search
USPC .................................................. 235/462.42
See application file for complete search history.

(56) References Cited

U.S. PATENT DOCUMENTS

| | | |
|---|---|---|
| 2012/0067956 A1 | 3/2012 | Gao |
| 2013/0248602 A1 | 9/2013 | He |
| 2014/0361085 A1 | 12/2014 | Panday |
| 2015/0076232 A1 | 3/2015 | Fukuba |
| 2015/0097034 A1 | 4/2015 | Kurokawa |
| 2017/0076122 A1 | 3/2017 | Giordano |
| 2018/0307880 A1 | 10/2018 | Gao |

FOREIGN PATENT DOCUMENTS

| | | | |
|---|---|---|---|
| JP | 2001043306 A | 2/2001 | |
| JP | 2001245111 A | 9/2001 | |
| JP | 2001326847 A | 11/2001 | |
| JP | 2006293596 A | 10/2006 | |
| JP | 2011076519 A | 4/2011 | |
| JP | 2011130165 A | 6/2011 | |
| JP | 2013042429 A | 2/2013 | |
| JP | 2015076106 A | 4/2015 | |
| JP | 6053224 B2 | 12/2016 | |
| JP | 2019129509 A | 8/2019 | |
| WO | WO-2016191557 A1 * | 12/2016 | ............... C07K 1/26 |

OTHER PUBLICATIONS

International Search Report issued in International Application No. PCT/JP2020/041589 dated Feb. 9, 2021.
Written Opinion issued in International Application No. PCT/JP2020/041589 dated Feb. 9, 2021.
Extended European Search Report issued in European Appln. No. 20886171.6 dated Dec. 14, 2021.
Extended European Search Report issued in European Appln. No. 21174435.4 dated Aug. 25, 2021.

* cited by examiner

[Fig. 1]
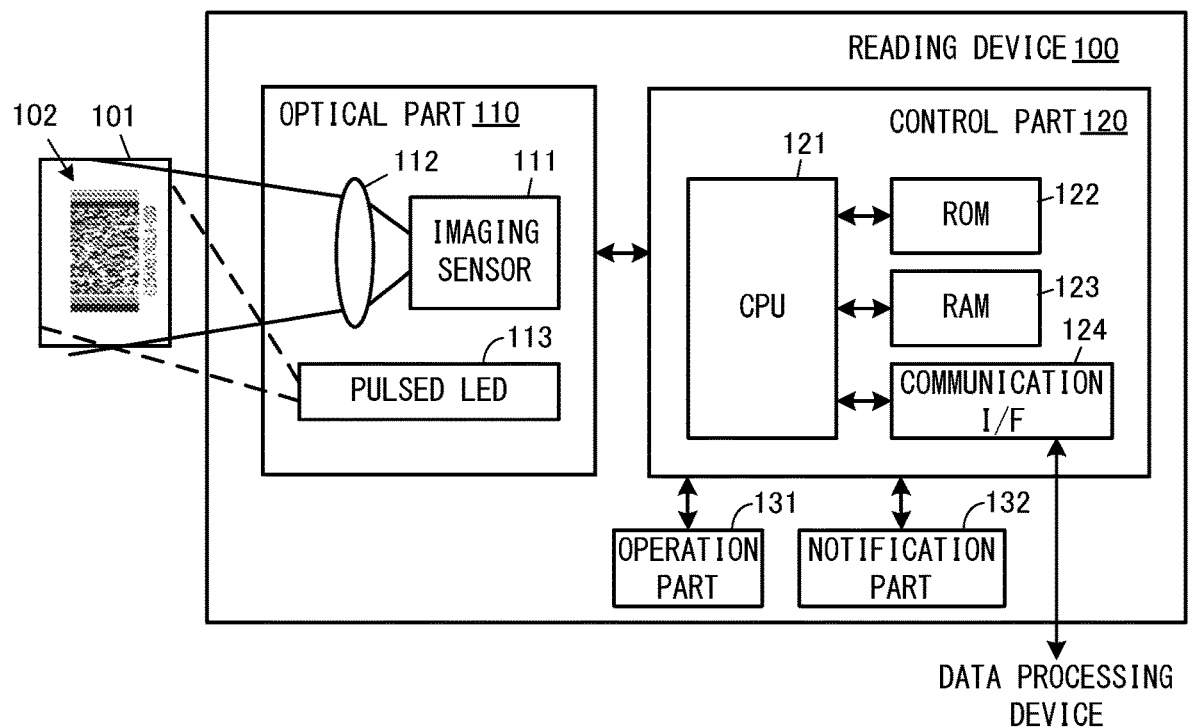
[Fig. 2]
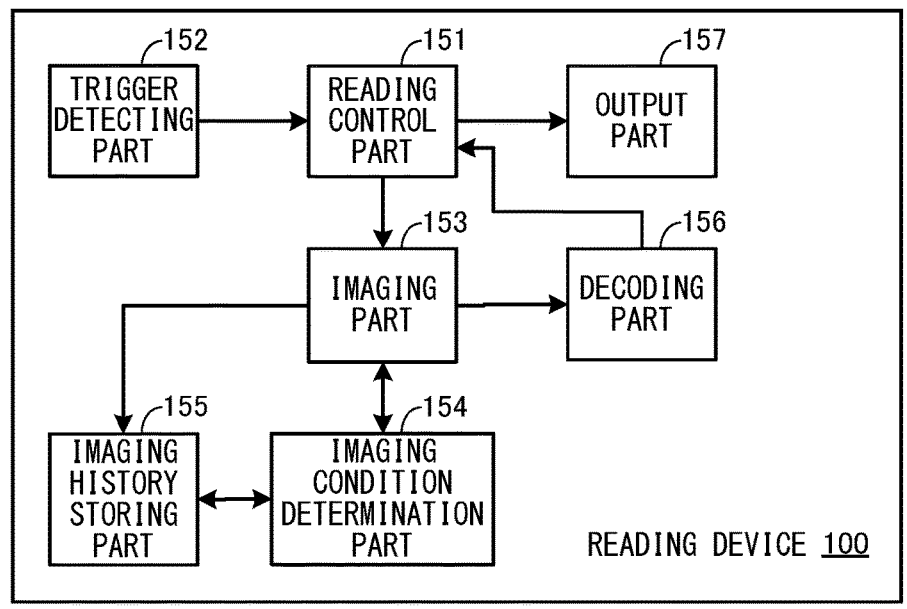

[Fig. 3A]
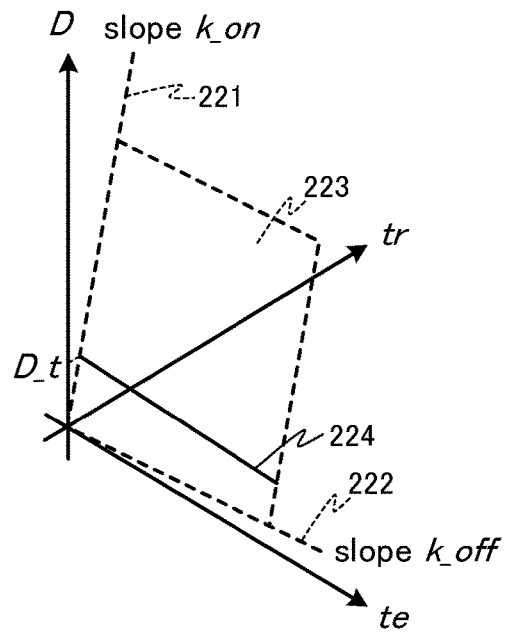
[Fig. 3B]
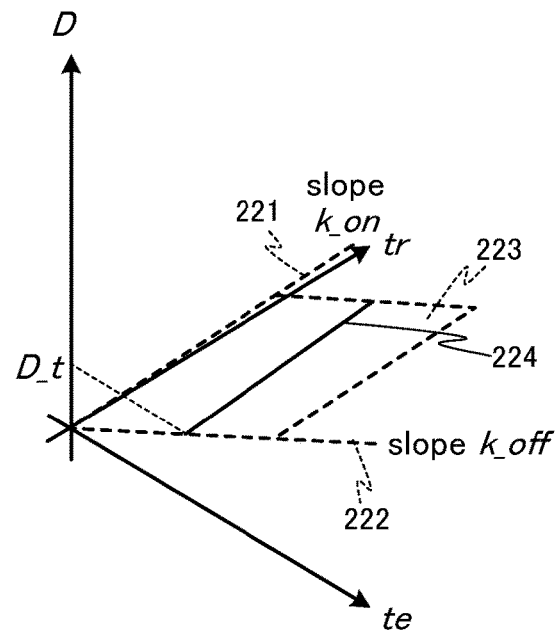
[Fig. 4A]
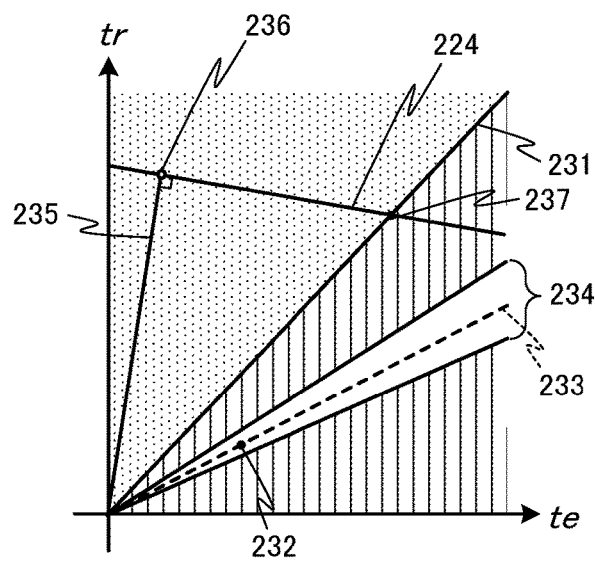
[Fig. 4B]
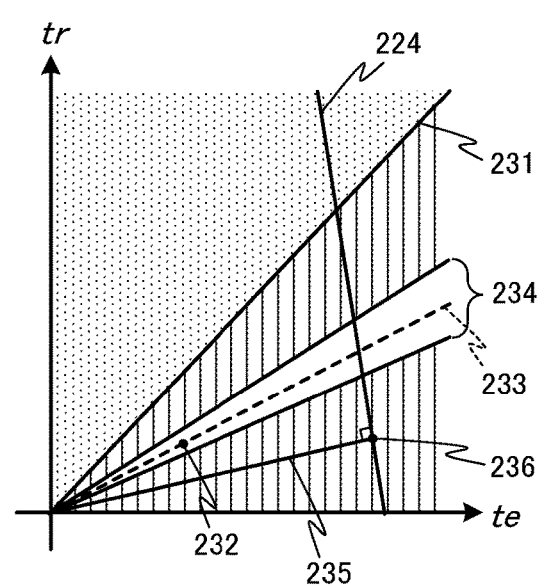

[Fig. 5]
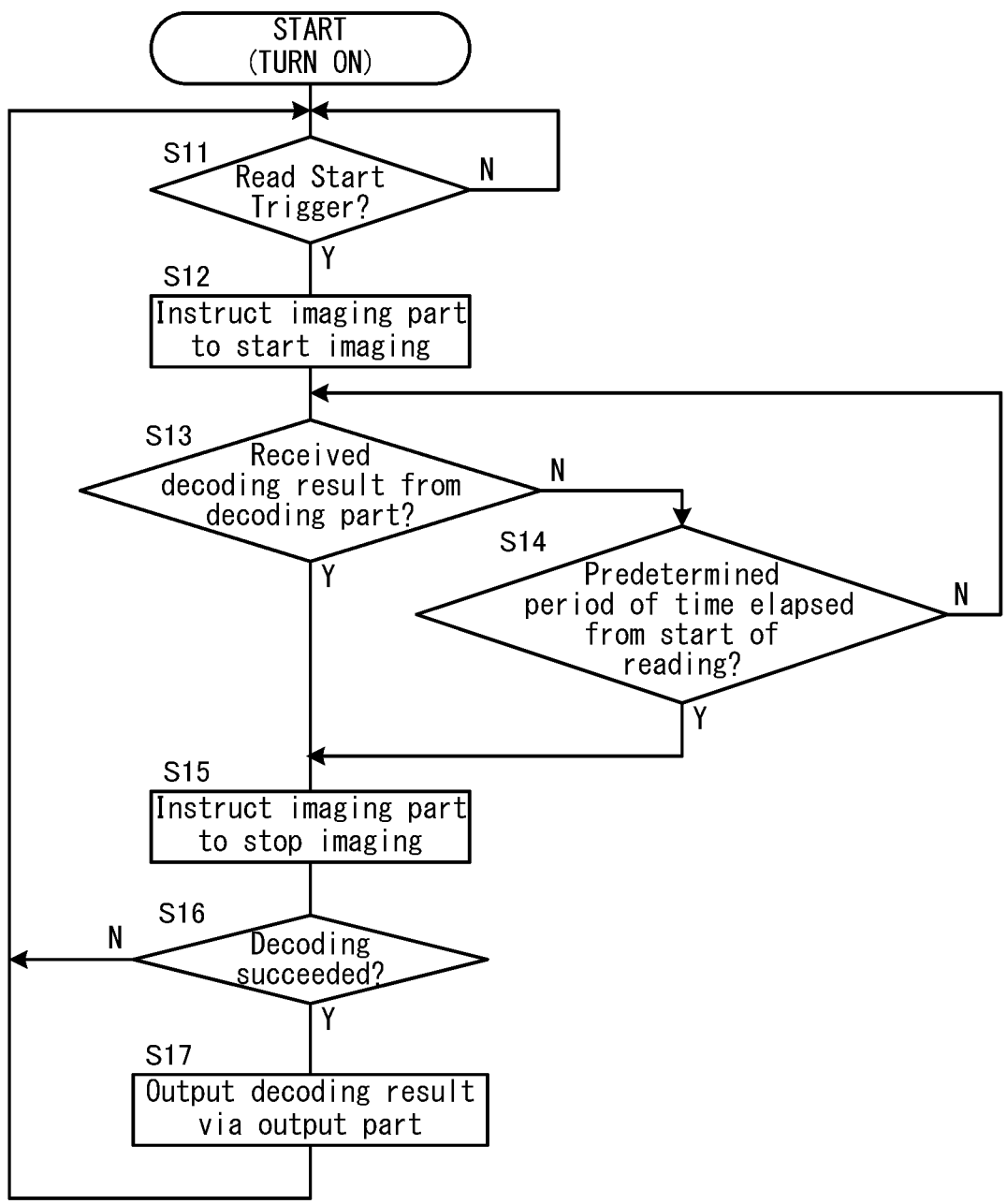

[Fig. 6]
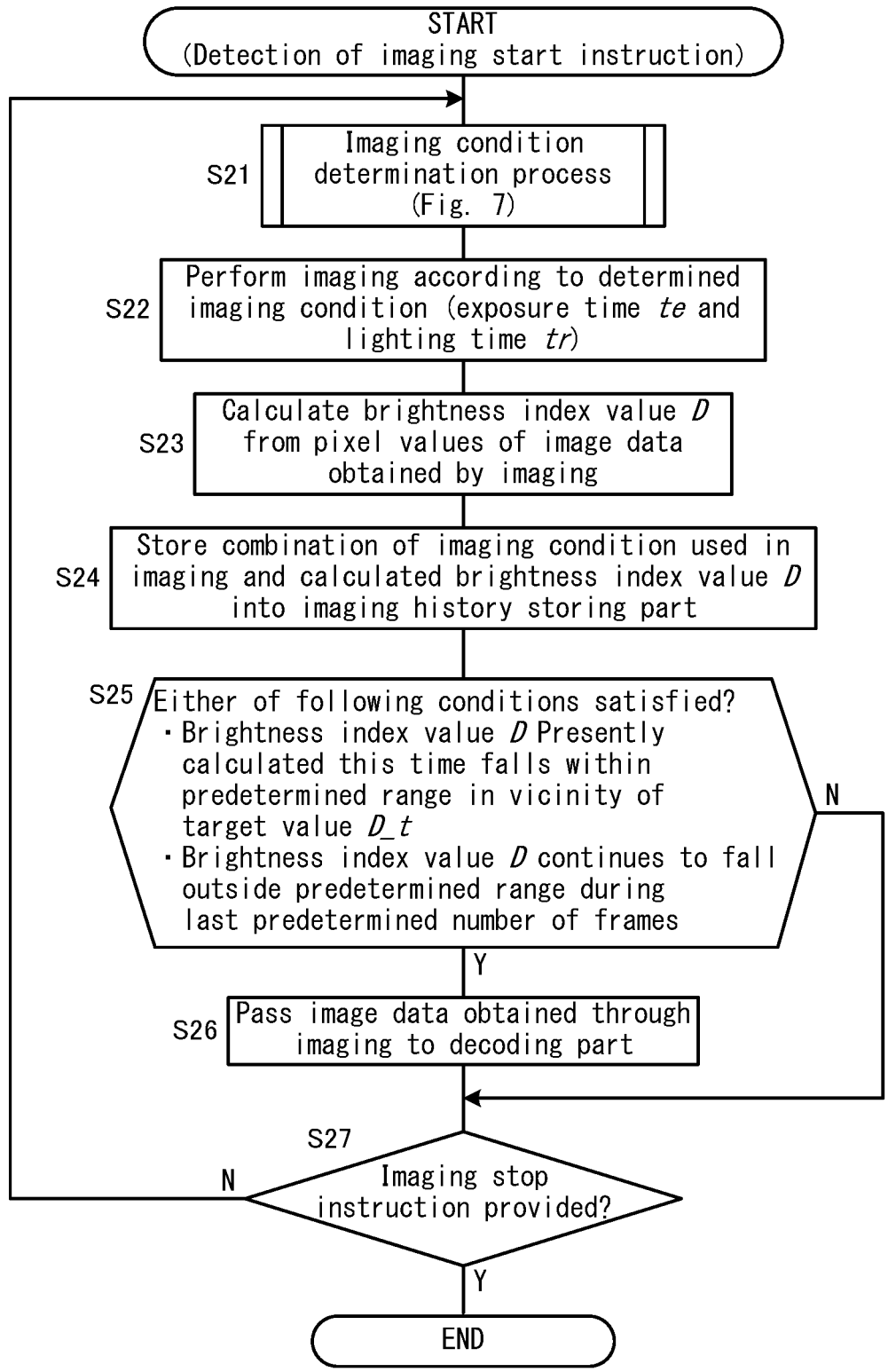

[Fig. 7]
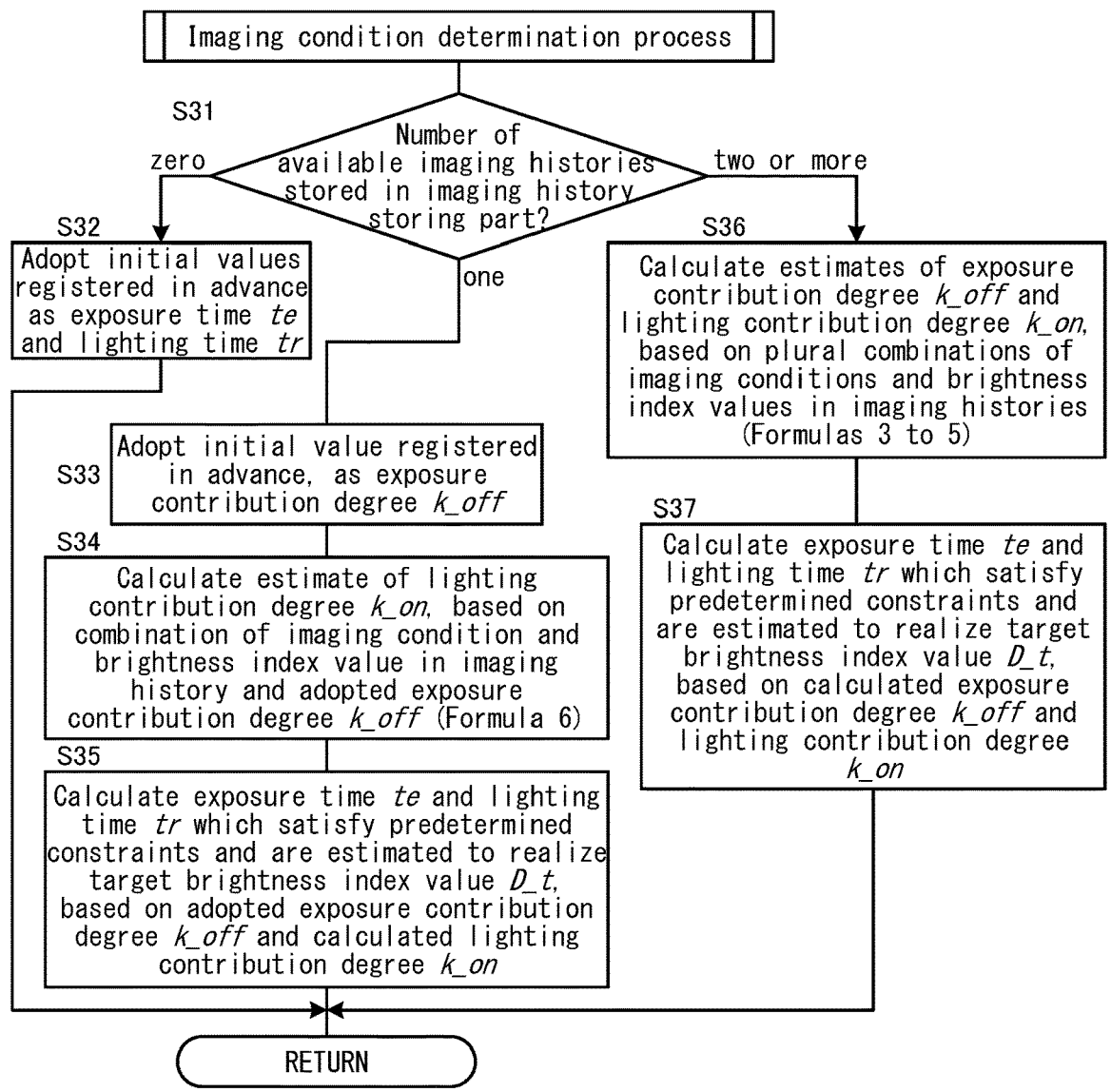
[Fig. 8]
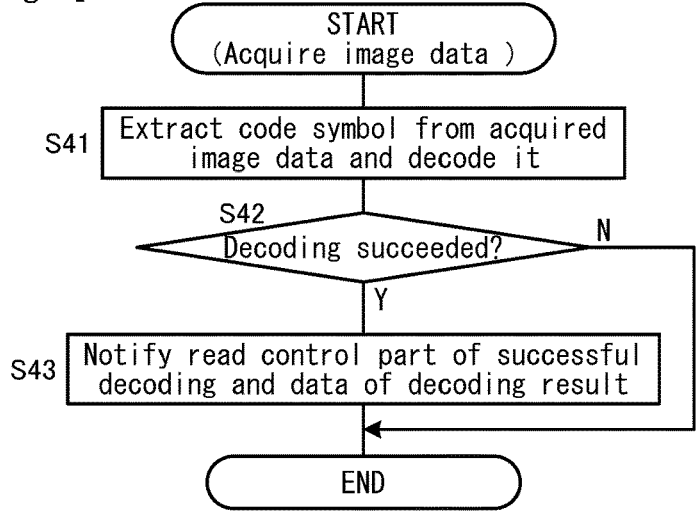

[Fig. 9]
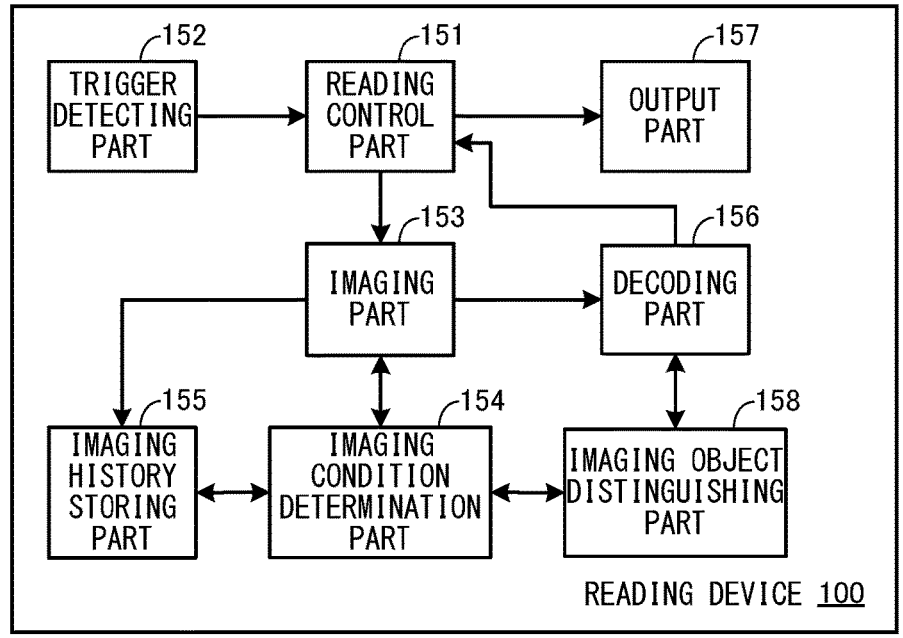
[Fig. 10]
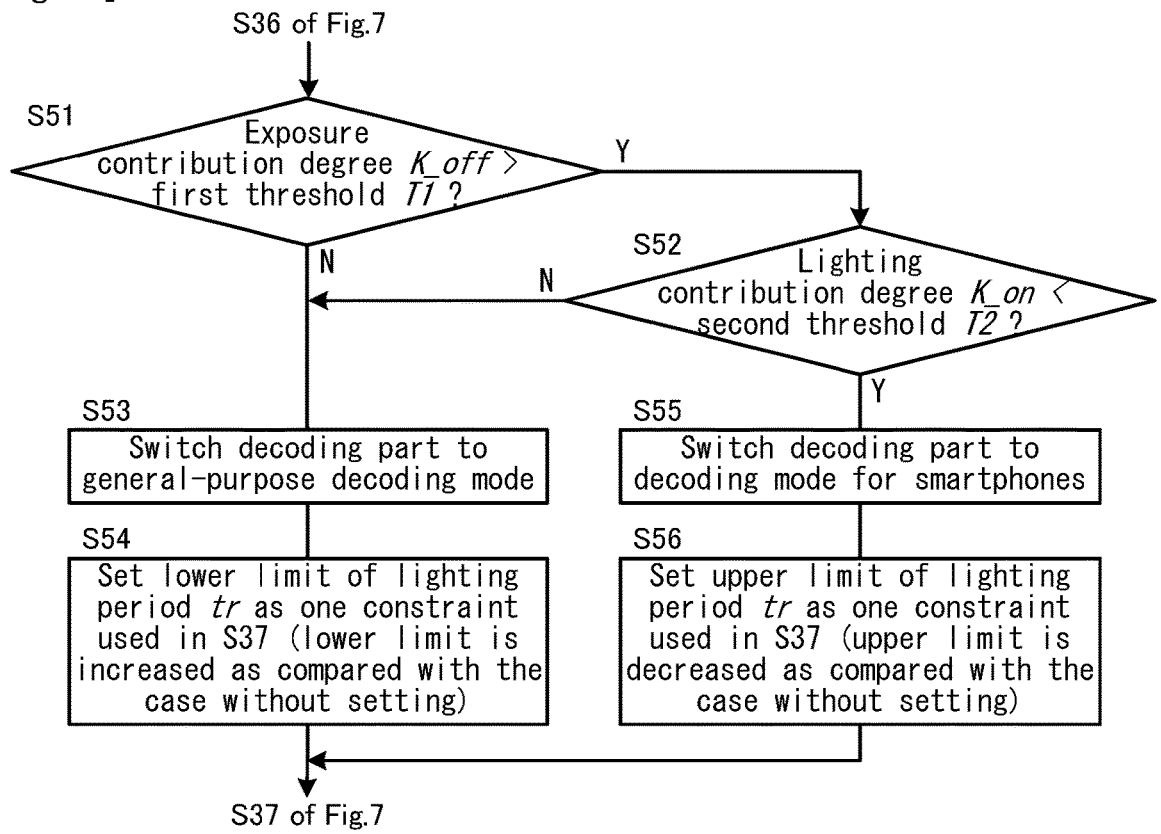

IMAGING METHOD, IMAGING DEVICE, METHOD FOR DISTINGUISHING IMAGING OBJECT, AND STORAGE MEDIUM

FIELD

The present invention relates to an imaging device comprising an imager and an illuminator for illuminating an imaging object of the imager, an imaging method by such an imaging device, and a non transitory machine readable storage medium containing program instructions for causing a computer to control an imaging device to execute the imaging method. The present invention also relates to a method of distinguishing an imaging object and an imaging method for an imaging device comprising an imager and an illuminator for illuminating an imaging object of the imager.

BACKGROUND

It has been conventionally adopted, in an optical information reading device for optically reading code symbols such as a bar code or a two-dimensional code for example, that the device images a read object, cuts out a code symbol from an image obtained by the imaging, and decodes it. In this case, since decoding cannot be performed if the image is too dark, it has been also adopted to provide an illuminator in the optical information reading device and to perform the imaging while illuminating the read object.

In this case, appropriate intensity and time of the illumination varies depending on the ambient environment and type of the reading object. Appropriate exposure time also varies depending on them. For this reason, various techniques for automatically adjusting the intensity and time of illumination to appropriate values have been developed as shown in PTL1 to PTL7, including those by the present applicant.

Among these documents, for example, PTL1 discloses setting an appropriate exposure time based on image intensities of captured images while performing continuous low intensity illumination and at least one pulse of high intensity illumination, in paragraph 0028, FIG. 5A or the like.

PTL2 discloses adjusting lighting time based on brightness of the image and distance to the read object, in paragraph 0038 or the like.

Incidentally, adjustment of illumination and exposure is also performed when imaging is performed for a purpose other than reading of code symbols, and PTL1 to PTL7 include documents that disclose techniques related to devices other than optical information reading devices.

CITATION LIST

Patent Literature

[PTL1] Japanese Patent No. 6,053,224
[PTL2] Japanese Patent Application Laid-Open Publication No. 2015-76106
[PTL3] Japanese Patent Application Laid-Open Publication No. 2001-43306
[PTL4] Japanese Patent Application Laid-Open Publication No. 2001-245111
[PTL5] Japanese Patent Application Laid-Open Publication No. 2011-130165
[PTL6] Japanese Patent Application Laid-Open Publication No. 2013-42429
[PTL7] Japanese Patent Application Laid-Open Publication No. 2019-129509

SUMMARY

Problem

Incidentally, in consideration of code symbols as an example, in recent years, code symbols are not only fixedly printed on a record carrier such as paper, but are also often dynamically displayed on a display device such as a display. For this reason, in operating environments of reding devices, it is often necessary to assume both record carriers and displays as objects to be read, i.e., objects to be imaged.

However, characteristics of the record carriers and the display devices are greatly different from each other in that the record carriers do not normally emit light by themselves, whereas most of the display devices emit light by themselves. For this reason, conditions suitable for imaging them are also greatly different.

Accordingly, it was sometimes difficult to obtain an image suitable for decoding code symbols simply by adjusting imaging conditions based on brightness of the images obtained by the imaging. For example, when reading a code symbol displayed on a display of a smartphone, since the display itself is emitting light, even if lighting time of the illumination is increased in consideration of insufficient brightness, it will not be expected that this increase contributes much to improvement of brightness of images. On the other hand, extending the exposure time is considered to be effective in improvement of brightness. Conversely, when reading a code symbol printed on paper, if the surroundings are dark, even if the exposure time is extended, improvement of brightness of images is not expected, and it is considered to be effective to increase lighting time of the illumination (within the range of the exposure time).

If both of light amount or time of the illumination and exposure time are increased, it is considered to be effective in both cases of smartphones and papers. However, when a smartphone is imaged, an unnecessary amount of illumination will be provided, and it may lead to increased power consumption and feeling of glare for the user. In addition, due to mirror reflection of a glass on the display surface of the smartphone, the illumination may interfere with the imaging.

It is also conceivable to distinguish the imaging object by some means and then perform control appropriate to the characteristics of the imaging object. However, it has been difficult to distinguish even paper and smart phones from each other with inexpensive hardware and software. For example, it is conceivable to determine that the read object is a smart phone when mirror reflection occurs on the surface of the imaging object, but appropriate distinction cannot be made based on this criterion when specular reflection does not occur because a protective sheet is attached, or the like. It is also conceivable that the operator sets the imaging object to the reading device by a switch or the like, but it is not practical if it is necessary to quickly read various objects.

It is an object of the present invention to solve such problems, and when imaging is performed by an imaging device while illuminating an imaging object, to enable to quickly set an appropriate imaging condition while assuming various imaging objects. From another aspect, it is an object of the present invention to enable, when an imaging object is a light-emitting body, to easily distinguish the fact, in a case of performing imaging by an imaging device while illuminating the imaging object. In either case, needless to say, purpose of the imaging is not limited to reading information such as code symbols, and the present invention can be applied to imaging for any purpose. The assumed imaging object is not limited to a record carrier such as paper and a display provided in a smart phone or the like, and is arbitrary.

Solution

To achieve the above object, the imaging method of the present invention is an imaging method of imaging by an imaging device comprising an imager and an illuminator configured to illuminate an imaging object of the imager, the method comprising: performing respective imagings according to respective imaging conditions each including an exposure time of the imager and a lighting time of the illuminator; storing respective combinations of brightnesses of respective images obtained by the respective imagings and the imaging conditions of the respective images in a memory; obtaining an estimate of a first parameter indicating degree of influence of variation of the exposure time on brightness of images and an estimate of a second parameter indicating degree of influence of variation of the lighting time on brightness of images, based on the combinations of the brightnesses and the imaging conditions stored in the memory; and determining an imaging condition to be used in a next imaging based on the estimate of the first parameter and the estimate of the second parameter.

Further, it is conceivable that the method further includes determining a relation between the exposure time and the lighting time such that the longer the lighting time is, the shorter the exposure time becomes, and the shorter the lighting time is, the longer the exposure time becomes, based on the estimate of the first parameter and the estimate of the second parameter, and the imaging condition to be used in the next imaging is determined to satisfy the determined relation.

Further, it is conceivable that the imaging condition to be used in the next imaging is determined such that the relation between the exposure time and the lighting time is satisfied and a ratio of the lighting time to the exposure time is different from that in latest imaging condition by a predetermined threshold or more.

Further, it is conceivable that the imaging condition to be used in the next imaging is determined such that a ratio of the lighting time to the exposure time is as close as possible to a ratio of the estimate of the second parameter to the estimate of the first parameter.

In the imaging method of the present invention, an amount of the illumination to the imaging object by the illuminator may be used instead of the lighting time.

The present invention also provides following distinguishing methods and an imaging method using such distinguishing methods, which are intended to enable, when an imaging object is a light-emitting body, to easily distinguish the fact, in a case of performing imaging by an imaging device while illuminating the imaging object. Also in these inventions, purpose of the imaging is not limited to reading information such as code symbols, and the present invention can be applied to imaging for any purpose. The assumed imaging object is not limited to a record carrier such as paper and a display provided in a smart phone or the like, and is arbitrary.

The distinguishing method of the present invention is a distinguishing method of distinguishing an imaging object by an imaging device comprising an imager and an illuminator configured to illuminate the imaging object of the imager, the method comprising: performing respective imagings according to plural imaging conditions each including an exposure time of the imager and a lighting time of the illuminator, the respective imaging conditions having different exposure times from one another; storing respective combinations of brightnesses of respective images obtained by the respective imagings and the imaging conditions of the respective images in a memory; and obtaining an estimate of degree of influence of variation of the exposure time on brightness of images based on the combinations of the brightnesses and the imaging conditions stored in the memory, and determining that the imaging object of the imager is a light-emitting body when the estimate is larger than a predetermined threshold.

Further, another distinguishing method of the present invention is a distinguishing method of distinguishing an imaging object by an imaging device comprising an imager and an illuminator configured to illuminate the imaging object of the imager, the method comprising: performing respective imagings according to plural imaging conditions each including an exposure time of the imager and a lighting time of the illuminator, the respective imaging conditions having different lighting times from one another; storing respective combinations of brightnesses of respective images obtained by the respective imagings and the imaging conditions of the respective images in a memory; and obtaining an estimate of degree of influence of variation of the lighting time on brightness of images based on the combinations of the brightnesses and the imaging conditions stored in the memory, and determining that the imaging object of the imager is a light-emitting body when the estimate is smaller than a predetermined threshold.

Further, still another distinguishing method of the present invention is a distinguishing method of distinguishing an imaging object by an imaging device comprising an imager and an illuminator configured to illuminate the imaging object of the imager, the method comprising: performing respective imagings according to plural imaging conditions each including an exposure time of the imager and a lighting time of the illuminator, ratios between the exposure times and the lighting times of the respective imaging conditions being different from one another; storing respective combinations of brightnesses of respective images obtained by the respective imagings and the imaging conditions of the respective images in a memory; obtaining an estimate of a first parameter indicating degree of influence of variation of the exposure time on brightness of images and an estimate of a second parameter indicating degree of influence of variation of the lighting time on brightness of images, based on the combinations of the brightnesses and the imaging conditions stored in the memory; and determining that the imaging object of the imager is a light-emitting body when the estimate of the first parameter is larger than a first threshold, and the estimate of the second parameter is smaller than a second threshold.

Further, still another distinguishing method of the present invention is a distinguishing method of distinguishing an imaging object by an imaging device comprising an imager and an illuminator configured to illuminate the imaging object of the imager, the method comprising: performing respective imagings according to plural imaging conditions each including an exposure time of the imager and a lighting time of the illuminator, ratios between the exposure times and the lighting times of the respective imaging conditions being different from one another; storing respective combinations of brightnesses of respective images obtained by the respective imagings and the imaging conditions of the respective images in a memory; obtaining an estimate of a first parameter indicating degree of influence of variation of the exposure time on brightness of images and an estimate of a second parameter indicating degree of influence of variation of the lighting time on brightness of images, based on the combinations of the brightnesses and the imaging conditions stored in the memory; and determining that the imaging object of the imager is a light-emitting body when a ratio of the estimate of the first parameter to the estimate of the second parameter is larger than a predetermined threshold.

The imaging method of the present invention is a method comprising: determining an imaging condition to be used in a next imaging using a smaller upper-limit of the lighting time if the imaging object is determined to be a light-emitting body thorough any one of the distinguishing methods than a case where the imaging object is not determined to be a light-emitting body through the distinguishing method, and using a larger lower-limit of the lighting time if the imaging object is not determined to be a light-emitting body through the distinguishing method than a case where the imaging object is determined to be a light-emitting body through the distinguishing method; and performing an imaging by the imaging device according to the determined imaging condition.

In addition to the manners described above, the present invention can be implemented in an arbitrary manner, such as a device, a method, a system, a computer program, a storage medium in which a computer program is recorded, or the like.

Effects

According to the configuration of the present invention as described above, when imaging is performed by an imaging device while illuminating an imaging object, it is possible to quickly set an appropriate imaging condition while assuming various imaging objects. In addition, according to the configuration of another aspect of the present invention, when an imaging object is a light-emitting body, it is possible to easily distinguish the fact, in a case of performing imaging by an imaging device while illuminating the imaging object.

BRIEF DESCRIPTION OF DRAWINGS

FIG. 1 is a block diagram showing a hardware configuration of the reading device 100 which is an embodiment of an imaging device of the present invention.

FIG. 2 is a functional block diagram showing a configuration of functions of the reading device 100 shown in FIG. 1.

FIG. 3A and FIG. 3B are diagrams for explaining an outline of a process for obtaining lighting time tr and exposure time te executed by the reading device 100.

FIG. 4A and FIG. 4B are other diagrams for explaining an outline of the process for obtaining the lighting time tr and the exposure time te executed by the reading device 100.

FIG. 5 is a flowchart of a process corresponding to a function of the read control part 151, executed by the CPU 121 of the reading device 100.

FIG. 6 is a flowchart of a process corresponding to a function of the imaging part 153 and the imaging condition determining part 154, executed by the same.

FIG. 7 is a flowchart of the imaging condition determination process shown in FIG. 6.

FIG. 8 is a flowchart of a process corresponding to a function of the decoding part 156, executed by the CPU 121 of the reading device 100.

FIG. 9 is a functional block diagram showing a configuration of functions of the reading device 100 of a second embodiment.

FIG. 10 is a flowchart of a process corresponding to a function of the imaging object distinguishing part 158, executed by the CPU 121 of the reading device 100 of the second embodiment.

DESCRIPTION OF EMBODIMENTS

Embodiments of the present invention will be explained referring to the drawings.

First Embodiment: FIG. 1 to FIG. 8

First, an embodiment of an imaging device of the present invention will be described with reference to FIG. 1. FIG. 1 is a block diagram showing a hardware configuration of a reading device which is an embodiment of the imaging device.

A reading device 100 shown in FIG. 1 is an optical information reading device for optically reading a code symbol 102 on a read object 101, indicated by a symbol having a light reflectance different from that of the surroundings, and is also an imaging device for capturing an image of the read object 101 at the time of the reading.

The read object 101 may be a record carrier that statically carries the code symbol 102, or may be a display that dynamically displays the code symbol. Material of the record carrier may be any of paper, metal, resin, and the like, and method of loading code symbol 102 on the record carrier may be any of printing, surface modification, stamping, and the like. The display may be a light-emitting body exhibiting information by emitting light by itself with a backlight or the like, or a device such as a reflective liquid crystal display device that exhibits information by reflecting light from the outside. Of course, it is not necessary to specify in advance which of the above-mentioned ones is the read object 101.

The code symbol 102 may be a one-dimensional bar code or a two-dimensional code, of any standard. It is not necessary to specify in advance the standard of the code symbol 102, and the standard may be distinguished in a decoding process described later.

As shown in FIG. 1, the reading device 100 includes an optical part 110, a control part 120, an operation part 131, and a notification part 132.

Among these, the optical part 110 includes an imaging sensor 111, a lens 112, a pulsed LED (light emitting diode) 113, and the optical part 110 is an imaging device for optically capturing an image of the read object 101 including the code symbol 102.

The imaging sensor 111 is an imager for capturing an image of the imaging object such as the read object 101, and for example, the imaging sensor 111 can be constituted by a CMOS (complementary metal-oxide semiconductor) image sensor. Further, the imaging sensor 111 can generate image data indicating gradation value of each pixel based on charge accumulated in each pixel of the image sensor by an imaging, and output the image data to the control part 120. In this imaging sensor 111, pixels are two-dimensionally arranged.

The lens 112 is an optical system for imaging the reflected light from the imaging object on the imaging sensor 111.

The pulsed LED 113 is an illuminator for irradiating illumination light to the imaging object of the imaging sensor 111.

Next, the control part 120 includes a CPU 121, a ROM 122 that stores data such as programs to be executed by the CPU 121 and various tables and the like, a RAM 123 used as a work area when the CPU 121 executes various processes, and a communication I/F 124 for communicating with external devices.

The CPU 121 executes programs stored in the ROM 122 using the RAM 123 as a work area to control operation of the entire reader 100 including the optical part 110, the operation part 131, and the notification part 132, thereby realizing various functions including those described later with reference to FIG. 2. In addition, the CPU 121 also performs processing such as detection and decoding of the code symbol 102 included in image data of the image captured by the imaging sensor 111, and output of the decoded result to the outside or accumulation thereof.

The communication I/F 124 is an interface for communicating with a variety of external devices, such as a data processing device that utilizes the decoded result of the code symbol 102.

The operation part 131 is an operation device such as a button and a trigger for accepting operations by the user. The notification part 132 is a notifier for performing various notifications to the user. Conceivable concrete notification methods include, but not limited to, display of messages or data by a display, lighting or blinking of a lamp, output of sounds by a speaker, and so on.

When the reading device 100 is automatically operated according to control from an external device or autonomous control, the operation part 131 and the notification part 132 can be omitted.

The reading device 100 described above can be configured as, for example, but not limited to, a hand-held type or a stationary type code symbol reading device.

In the above-described reading device 100, one of the characteristic points is a method for determining an imaging condition to be used in the next imaging based on combinations of brightnesses of the images obtained by the past imagings by the imaging sensor 111 and the imaging conditions used in the respective imagings. Next, this point will be explained.

First, functions of the reading device 100 related to reading of code symbols, including the function of determining imaging conditions described above, will be described. FIG. 2 is a functional block diagram showing a configuration of the functions.

As shown in FIG. 2, the reading device 100 includes functions of a read control part 151, a trigger detecting part 152, an imaging part 153, an imaging condition determining part 154, an imaging history storing part 155, a decoding part 156, and an output part 157. In the example described here, the functions of the respective parts are realized by the CPU 121 controlling the respective parts of the reading device 100 including the optical part 110 by executing software, but some or all of the functions may be realized by dedicated control circuits.

The read control part 151 shown in FIG. 2 has a function of comprehensively controlling operations related to reading of the code symbol 102, from imaging of the read object 101 to decoding of the code symbol 102. This function includes starting of the imaging in response to detection of a read start trigger, stopping of the imaging and output of the decoding result in response to detection of a decoding completion trigger, and the like.

The trigger detecting part 152 has functions of monitoring occurrence of the read start trigger and notifying the read control part 151 of the occurrence of the read start trigger when the read start trigger is detected. What is adopted as the read start trigger may be arbitrarily determined by the manufacturer or a user of the reading device 100. For example, the read start trigger may be an operation of the trigger switch provided in the operation part 131, entry of some object into the imaging range of the imaging sensor 111, or the like. In the latter case, a sensor such as an infrared sensor for detecting the object may be provided in the reading device 100. Further, the user may be able to arbitrarily switch what is adopted as the trigger.

The imaging part 153 has functions of controlling the optical part 110 to perform an imaging in response to a start instruction from the read control part 151, and acquiring image data obtained by the imaging. This imaging is performed according to the conditions determined by the imaging condition determining part 154. Further, the imaging part 153 has a function of transferring, when decoding the image obtained by the imaging, the acquired image data to the decoding part 156, and a function as a storer configured to store a combination of the imaging condition used in the imaging and brightness of the image obtained by the imaging, in the imaging history storing part 155 as an imaging history.

The imaging condition determining part 154 has functions of determining an imaging condition suitable for imaging the current read object 101 based on combinations of the imaging conditions and the brightnesses stored in the imaging history storing part 155, and providing the imaging part 153 with the determined imaging condition. In this embodiment, the imaging condition determining part 154 determines the exposure time of the imaging sensor 111 and the lighting time of the pulsed LED 113 as the imaging condition, but it is not prevented to determine other conditions together. Details of an algorithm for this determination will be described later.

The imaging history storing part 155 has a function of storing combinations of the imaging conditions used in the imagings by the imaging part 153 and the brightnesses of the images obtained by the imagings. The hardware used for the storing may be hardware provided in the reading device 100, such as the RAM 123, or hardware external to the reading device 100.

The decoding part 156 has functions of performing decoding process on the code symbol 102 included in the image data transferred from the imaging part 153, and transferring, when the decoding succeeds, the fact and data of the decoding result to the read control part 151.

The output part 157 has functions of outputting the decoding result of the code symbol 102 to an external device such as a data processing device and notifying the user of the successful reading, via the communication I/F 124 and the notification part 132. The notification method to the user may be any method such as a buzzer or vibration, or the notification may be omitted when the notification is unnecessary.

Next, a basic concept of the reading condition determination performed by the imaging condition determining part 154 in the above-described reading device 100 will be described.

First, the imaging condition determining part 154 determines an imaging condition so that an image having a brightness suitable for the decoding can be obtained through the imaging by the imaging part 153. The brightness can be obtained, for example, as a percentile value of around the top several percent of pixel values of sample pixels of about several hundred pixels in an image. Appropriate offset processing may be performed. Anyway, in this specification, we introduce a value of a parameter indicating brightness of an image as a brightness index value D1, and the imaging condition will be determined so that an image having a brightness index value D1 at a predetermined target value D1_t can be obtained.

Here, when the ambient environments, the read object and its position are constant, that is, when imagings of a plurality of frames are performed on a particular read object in a short time, assumed are a lighting time tr of the pulsed LED113, an exposure time te of the imaging sensor 111, and a gain g of the imaging sensor 111 as parameters that affect the brightness index value D1. The relationship between the brightness index value D1 and these parameters can be approximately expressed as Formula 1 below.

[Math 1]

$$D1 = g(k\_on \cdot tr + k\_off \cdot te) \quad \text{(Formula 1)}$$

Here, k_off is an exposure contribution degree (first parameter) indicating a degree of influence of variation of the exposure time te on brightness of images, and k_on is a lighting contribution degree (second parameter) indicating a degree of influence of variation of the lighting time tr on brightness of images. Formula 1 is obtained based on a thought that: the amount of light detected by the imaging sensor 111 is substantially proportional to the exposure time te; when the pulsed LED113 is turned on, the amount of light increases by an amount proportional to the lighting time tr; and the brightness (brightness index value D1) of the image is determined by, at how much magnification of gain g the light amount is reflected to the pixel value.

Here, light amount of the illumination by the pulsed LED113 is assumed to be constant at all times during the lighting, and the respective contributions of the exposure time te and the lighting time tr are assumed to be linear. Even if such assumptions are made, determination of the imaging condition can be performed with sufficient accuracy. Examples considering variations in light amount of the illumination will be described later as a modification.

In Formula 1, the values of k_on and k_off are determined according to ambient environment, reading object, and position thereof, and when these conditions are constant, k_on and k_off can be regarded as constants. Therefore, by appropriately determining the values of tr, te, and g, it can be expected that the brightness index value D1 of an image obtained by the imaging becomes a desired value or a value in the vicinity thereof.

However, for simplicity of control, here we consider to obtain a desired brightness index value D1 by adjusting the lighting time tr and the exposure time te, while fixing the gain g.

Therefore, we introduce a brightness index value D, where D=D1/g. Using the brightness index value D, the relationship shown by Formula 1 can be shown as following Formula 2. Then, in the following, we consider to obtain a lighting time tr and an exposure time te by which the brightness index value D of an image obtained by the imaging becomes a predetermined target value D_t.

[Math 2]

$$D = k\_on \cdot tr + k\_off \cdot te \quad \text{(Formula 2)}$$

For this purpose, the imaging condition determining part 154 first estimates values of k_on and k_off.

Specifically, the imaging condition determining part 154 performs imagings while changing the lighting time tr and the exposure time te, and applies the lighting time tr, the exposure time te, and the brightness index value D of the image obtained by each imaging to Formula 2 to obtain relational expressions Formula 3. In Formula 3, D_ci is brightness index value D of the image obtained by the i-th imaging, and tri and tei are lighting time tr and exposure time te of the imaging condition used in the i-th imaging, respectively, where i is a natural number. x is the number of imaging histories available for estimating values of k_on and k_off.

[Math 3]

$$\begin{cases} D\_c1 = k\_on \cdot tr1 + k\_off \cdot te1 \\ D\_c2 = k\_on \cdot tr2 + k\_off \cdot te2 \\ \quad \vdots \\ D\_cx = k\_on \cdot trx + k\_off \cdot tex \end{cases} \quad \text{(Formula 3)}$$

In Formula 3, since only k_on and k_off are unknowns, estimates of k_on and k_off can be obtained by solving Formula 3 regarding it as simultaneous equations of k_on and k_off. If there are three or more equations, the solutions of k_on and k_off cannot be uniquely determined, but approximations of solutions of k_on and k_off that roughly satisfy all equations can be obtained through calculation according to Formula 4 and Formula 5 below.

[Math 4]

$$\begin{bmatrix} D\_c1 \\ D\_c2 \\ \vdots \\ D\_cx \end{bmatrix} = \begin{bmatrix} tr1 & te1 \\ tr2 & te2 \\ \vdots & \vdots \\ trx & tex \end{bmatrix} \begin{bmatrix} k\_on \\ k\_off \end{bmatrix} \quad \text{(Formula 4)}$$

[Math 5]

$$\text{Let } D = \begin{bmatrix} D\_c1 \\ D\_c2 \\ \vdots \\ D\_cx \end{bmatrix}, S = \begin{bmatrix} tr1 & te1 \\ tr2 & te2 \\ \vdots & \vdots \\ trx & tex \end{bmatrix}, K = \begin{bmatrix} k\_on \\ k\_off \end{bmatrix},$$

$$K = (S^T S)^{-1} S^T D \quad \text{(Formula 5)}$$

Formula 4 represents the same content as Formula 3 using matrices, and Formula 5 is derived by modifying Formula 4 for obtaining value of the matrix K on the left side. In Formula 5, $X^T$ denotes the transpose of matrix X, and $X^{-1}$ denotes the inverse of matrix X. Formula 5 can be derived by sequentially multiplying matrix $S^T$ and matrix $(S^T S)^{-1}$ from the left on both sides of Formula 4 and organizing the formula.

In view of the meaning of Formula 2, both k_on and k_off are considered to be positive values. Therefore, if the result of the calculation according to Formula 5 is zero or less, appropriate small positive values may be adopted as the estimates.

Further, in the case of x=2, when ratios between the lighting times tr and the exposure times te are the same regarding the two imagings, the solutions cannot be determined. Accordingly, it is preferable to use imaging conditions with different ratios between the lighting times tr and the exposure times te in the two imagings. Further, even if x is 3 or more, when all the ratios between the lighting times tr and the exposure times te regarding the x-times imagings are the same, the solutions cannot be determined. Accordingly, it is preferable to vary the ratio between the lighting time tr and the exposure time te appropriately in each imaging.

When the estimate of k_on and k_off are obtained as described above, the imaging condition determining part 154 determines the lighting time tr and the exposure time te to be used in the next imaging using the estimates. Next, this point will be described with reference to the graphs of FIG. 3A to FIG. 4B.

FIG. 3A and FIG. 3B show graphs of Formula 2 on tr-te-D space, and the reference numeral 223 denotes a plane represented by Formula 2. FIG. 3A and FIG. 3B are two examples showing this plane 223 regarding different combinations of values of k_on and k_off.

FIG. 3A is an example where k_on is large and k_off is small. For example, when attempting to image a non-light-emitting body such as paper in a dark environment, amount of light incident on the imaging sensor 111 will not change so much even if the exposure time te is lengthened, and amount of incident light will largely increase and it will be reflected to brightness of the image if the lighting time tr is lengthened, which exhibits the tendency as shown in FIG. 3A.

FIG. 3B is an example where k_on is small and k_off is somewhat large. For example, when attempting to image a light-emitting body such as a display of a smartphone, if the exposure time te is lengthened, light emitted by the display will be incident on the imaging sensor 111 for a long time, and thus amount of light incident on the imaging sensor 111 will be increased, and it will be reflected to brightness of the image. However, even if the lighting time tr is lengthened, although amount itself of light incident on the imaging sensor 111 will increase accordingly, influence of the increase on brightness of the image will be small, since the increased light is weaker than the light emitted by the display and incident within the same term. Therefore, the tendency as shown in FIG. 3B is exhibited.

These FIG. 3A and FIG. 3B merely show two examples, and other cases where, for example, both k_on and k_off are somewhat large value are also conceivable. In the first embodiment, the imaging condition determining part 154 does not need to change the calculation algorithm of the lighting time tr and the exposure time te according to the values of the estimates of k_on and k_off. That is, it is not necessary to determine what the imaging object is or how the imaging environment is, based on the estimates of k_on and k_off.

In both FIG. 3A and FIG. 3B, the plane 223 represented by Formula 2 is a plane including: a line 221 on tr-D plane having a slope of k_on and passing through the origin; and a line 222 on te-D plane having a slope of k_off and passing through the origin. In order to obtain the target value D_t as the value of the brightness index value D, it is only necessary to determine a combination of the lighting time tr and the exposure time te such that the combination falls on a line 224 which is the intersection line between the plane 223 and the plane of D=D_t. This line 224 is referred to as "solution providing line" in the sense of a line indicating relationship between the values of tr and te to be determined. This point is common to both the example of FIG. 3A and the example of FIG. 3B.

The imaging condition determining part 154 selects some point on the solution providing line 224 in accordance with predetermined constraints, and adopts the coordinate values of tr and te of the point as the lighting time tr and the exposure time te to be used in the next imaging, respectively. Next, these constraints will be explained.

FIG. 4A and FIG. 4B illustrate an example of the constraints while projecting the solution providing line 224 on the te-tr plane. FIG. 4A and FIG. 4B correspond to FIG. 3A and FIG. 3B, respectively.

The first one among constraints shown in FIG. 4A and FIG. 4B is 0≤te, tr. This is because neither the exposure time nor the lighting time can take negative values.

The second constraint is tr≤te. Even if the light is emitted longer than the exposure time, there is no effect on brightness of the image, resulting in waste of power, and accordingly this constraint is prepared. In each of FIG. 4A and FIG. 4B, the line 231 is the line of tr=te, and the region with dot hatching is excluded by the second constraint.

The third constraint is ρ≤(tr/te)/(trα/teα) or (tr/te)/(trα/teα)≤1/ρ, where teα and trα are the exposure time and the lighting time in the previous imaging, respectively, and ρ is an appropriate constant larger than 1. This is a constraint to differentiate the ratio between the lighting time tr and the exposure time te by a predetermined threshold or more as compared with one used in the previous imaging, and to exclude the range of more than 1/ρ times and less than ρ times of the previous value. In each of FIG. 4A and FIG. 4B, the point 232 is (teα, trα), the line 233 is a line passing through the origin and the point 232, and the range indicated by reference numeral 234 with no hatching is excluded by the third constraint.

Therefore, the imaging condition determining part 154 adopts some point on the solution providing line 224 in the range indicated by vertical hatching, as the lighting time tr and the exposure time te to be used in the next imaging.

Note that the slope of the solution providing line 224 on the te-tr plane is negative value because it is −k_off/k_on. That is, the solution providing line 224 determines a relationship between the exposure time te and the lighting time tr such that the exposure time te becomes shorter as the lighting time tr becomes longer and the exposure time te becomes longer as the lighting time tr becomes shorter.

Then, if the intersection 236 of the perpendicular 235 dropped from the origin to the solution providing line 224 and the solution providing line 224 is within a range satisfying the constraints, the imaging condition determining part 154 adopts the coordinates of the intersection 236. FIG. 4B corresponds to this case. If the intersection 236 is not within the range satisfying the constraints, the coordinates of the point 237 which is as close to the intersection 236 as possible within the range satisfying the constraints are adopted. FIG. 4A corresponds to this case.

In either case, since the slope of the perpendicular 235 is k_on/k_off, at the intersection 236, tr=(k_on/k_off)·te, that is, tr/te=k_on/k_off Therefore, the imaging condition determining part 154 determines the exposure time te and the lighting time tr such that the ratio of the lighting time tr to the exposure time te is as close to the ratio of the estimate of the second parameter k_on to the estimate of the first parameter k_off as possible.

The reason why the intersection 236 is adopted is that this point is the closest to the origin on the solution providing line 224. It can be considered that an image having the brightness index value D at the target value D_t can be obtained by adopting whichever point on the resolution straight line 224, but if the exposure time te is too long, the time of one frame becomes longer and the reading time extends, and if the lighting time tr is too long, the power consumption increases, and then if the pulsed LED113 is visible from the user, the user feels dazzling. It can be considered that the imaging condition that achieve a balance between the exposure time te and the lighting time tr can be determined by adopting the coordinates of the point as close to the intersection 236 as possible.

As can be seen from FIG. 4A and FIG. 4B, in the case of FIG. 4A, a lighting time tr enough for obtaining a sufficient amount of light by the reflected light from the read object 101 and an exposure time te that is almost the same as tr are determined. In the case of FIG. 4B, an exposure time te enough for obtaining a substantially sufficient amount of light by the light emitted from the read object 101 and a short lighting time tr are determined.

Based on the above-described concept, it is possible to automatically and quickly set an imaging condition using a common algorithm such that an image having a preferred brightness can be obtained without lighting the pulsed LED113 for an unnecessarily long time and with not too long frame time, regardless of what the read object 101 is and how the ambient environment is. It can be expected that an imaging condition capable of achieving the target value D_t of the brightness index value with a certain degree of accuracy can be set in the third frame for which data in two frames are available as the imaging histories.

It is not necessary to execute the calculation process of k_on, k_off, and tr, te step-by-step separately as described above. What has been described here is a basic concept, and calculation for obtaining the result in several steps later may be analytically or approximately determined and executed, by combining the several steps.

Further, conditions other than those shown in FIG. 4A and FIG. 4B may be considered as constraints which the exposure time te and the lighting time tr should satisfy. The conditions shown in FIG. 4A and FIG. 4B may differ from those described above in specific details.

For example, to prevent noises in reading out of the image data from the imaging sensor 111 after the imaging, caused by voltage variation at the time of turning off the pulsed LED113, it is conceivable to terminate the lighting by a predetermined time k before the end of the exposure time te. In this case, the constraint is te≤tr−k.

Further, the maximum value and the minimum value of the exposure time te may be determined based on the restrictions on frame period and shutter speed. Further the maximum value and the minimum value of the lighting time tr may be determined based on the restrictions on response speed, heat generation, power consumption, and the like of the pulsed LED113.

Further, the point to be adopted as the exposure time te and the lighting time tr on the solution providing line 224 is not limited to the intersection with the perpendicular 235. For example, with respect to an appropriate positive constant β, a point satisfying tr/te=β·(k_on/k_off) may be adopted. A condition where the lighting time is longer and the exposure time is shorter will be set as β is larger, and a condition where the lighting time is shorter and the exposure time is longer will be set as β is smaller. The value of β may be adjusted by the user in accordance with the mode of use of the reading device 100 or the ambient environment.

Next, referring to FIG. 5 to FIG. 8, processes executed by the CPU 121 for the reading control of the code symbol 102, including a process for determining the exposure time to and the lighting time tr as described above, will be described. The process described here is an embodiment of an imaging method of the present invention. In addition, a process up to preparation of imaging histories of two frames, which has been omitted in the description above, is included.

First, FIG. 5 shows a flowchart of a process corresponding to the function of the read control part 151.

When the reading device 100 is turned on, the CPU 121 starts the process shown in FIG. 5.

In this process, the CPU 121 first waits until detecting notification of read start trigger from the trigger detecting part 152 (S11). When detecting this notification, the CPU 121 instructs the imaging part 153 to start imaging in order to read the code symbol 102 (S12).

Thereafter, the CPU 121 waits until receiving decoding result from the decoding part 156 (Yes in S13) or a predetermined period of time elapses from the start of reading (Yes in S14), and when either of these is satisfied, the CPU 121 instructs the imaging part 153 to stop imaging (S15). In the former case, decoding (reading) succeeded, in the latter case, reading failed due to timeout.

If the decoding succeeded (Yes in S16), the CPU 121 outputs the decoding result through the output part 157 and the process returns to step S11. At this time, the CPU 121 may notify the user of the decoding success by sound or light. If the decoding failed (No in S16), the process directly returns to step S11.

Next, FIG. 6 shows a flowchart of a process corresponding to the functions of the imaging part 153 and the imaging condition determining part 154.

The CPU 121 starts the process of FIG. 6 when detecting the imaging start instruction provided through step S12 of FIG. 5.

In this process, the CPU 121 first executes the imaging condition determination process shown in FIG. 7 (S21). This process is a process for determining the exposure time to and the lighting time tr to be used in the next imaging as described with reference to FIG. 3A to FIG. 4B, and this process will be described later.

Next, the CPU 121 controls the optical part 110 to perform an imaging of one frame according to the imaging condition determined in step S21 (S22). Then, the CPU 121 calculates the brightness index value D from the pixel values of the image data obtained by the imaging (S23), and store a combination of the imaging condition used in the imaging and the calculated brightness index value D into the imaging history storing part 155 (S24). At this time, data indicating the number of frames of the imaging in the presently started process is also stored. The data stored in step S24 is referred to in the imaging condition determination process of FIG. 7.

Thereafter, the CPU 121 determines whether or not either of the following conditions is satisfied, the conditions are: the brightness index value D calculated this time falls within a predetermined range in the vicinity of the target value D_t (suitable for decoding); and the brightness index value D continues to fall outside the predetermined range during last predetermined number of frames (continue the trial because it seem to take a long time although D does not converge to the preferable range) (S25). If Yes in S25, the CPU 121 determines to decode the image data obtained in the present imaging, and passes the image data to the decoding part 156 (S26).

If No in step S25, the CPU 121 determines not to decode the image data obtained in the present imaging, skips step S26, and proceeds to step S27.

Thereafter, if the CPU 121 has received the imaging stop instruction provided through step S15 of FIG. 5 (Yes in S27), the process of FIG. 6 ends, and if not, the process returns to step S21 to repeat the process. The determination in step S27 becomes Yes if decoding has already succeeded or the reading times out.

Next, FIG. 7 shows a flowchart of the imaging condition determination process shown in FIG. 6. This process corresponds to the function of the imaging condition determining part 154.

The CPU 121 starts the process of FIG. 7 in step S21 of FIG. 6.

In this process, the CPU 121 first checks how many imaging histories available for determining an imaging condition to be used in the present reading are stored in the imaging history storing part 155 (S31). Then, the process is branched according to the number.

Basically, it is considered that the imaging histories stored after the last start of the process of FIG. 6 are available, but may be limited to those of the latest predetermined number of frames. Alternatively, if long time has not elapsed since the previous decoding, the imaging histories of the last predetermined number of frames used in the previous decoding may also be available, because it can be assumed that there has been no significant difference in the ambient environment. By doing so, it is possible to accurately set a suitable imaging condition from the first frame in step S37.

However, when it is assumed that reading objects 101 having different characteristics, such as paper and smartphones, are mixed, it is preferable not to use the imaging histories of the previous decoding. The user may be allowed to arbitrarily switch the mode between a mode of using the imaging histories of the previous decoding and another mode not using the imaging histories of the previous decoding.

When the number of available imaging histories is zero in step S31, there is no data for determining the exposure time te and the lighting time tr to be used in the imaging, and thus the CPU 121 adopts the initial values registered in advance as the exposure time te and the lighting time tr to be used in the subsequent imaging (S32), and returns to the process of FIG. 6. As these initial values, it is preferable to register values suitable for the ambient environment or the read object 101 in/on which the most frequently the reading is performed. For example, it is preferable to register values suitable for reading a sheet at a standard distance in a standard indoor brightness.

Next, when the number of available imaging histories is one in step S31, the estimated values of k_on and k_off cannot be obtained yet according to Formula 3 to Formula 5. Therefore, the CPU 121 adopts, as k_off, the initial value registered in advance (S33). This initial value may be the same as or different from the value employed in step S32.

Then, the CPU 121 calculates an estimate of k_on based on a combination of the imaging condition and the brightness index value D in the imaging history and the k_off adopted in step S33 (S34). Specifically, the estimate can be obtained by substituting te, tr in the imaging condition, brightness index value D, and the exposure contribution degree k_off into following Formula 6 obtained by modifying Formula 2.

[Math 6]

$$k\_on = (D - k\_off \cdot te)/tr \quad \text{(Formula 6)}$$

Thereafter, the CPU 121 calculates an exposure time te and a lighting time tr which satisfy the predetermined constraints and are estimated to realize the target brightness index value D_t, as described above with reference to FIG. 3A to FIG. 4B, based on k_off adopted in step S33 and k_on calculated in step S34 (S35). Then, the CPU 121 determines the calculated te and tr as the exposure time te and the lighting time tr to be used in the next imaging, and the process returns to the process of FIG. 6.

Note that the reason why the default initial value is adopted regarding k_off in Step 33 is that k_off causes less negative effect than k_on even if the value deviates from the target value. However, even if the default initial value is adopted regarding k_on, the calculation in steps S34 and S35 can be performed similarly to the case described above. However, in this case, an equation obtained by arranging Formula 2 so that the left side becomes k_off is used instead of Formula 6.

Further, in step S35, it is not necessary to adopt the coordinate values of the intersection point 236 between the solution providing line 234 and the perpendicular 235 as the exposure time te and the lighting time tr as shown in FIG. 4A and FIG. 4B. Since it has not been reached a situation in which k_on, k_off, te, and tr can be stably calculated yet, for example, by adopting the coordinate values of the point closest to the line 233 within the range satisfying the constraints, it is possible to prevent te and tr from becoming extreme values and adversely affecting the next imaging or the subsequent calculations of k_on, k_off, te, and tr.

Next, when the number of available imaging histories is two or more in step S31, estimates of k_on and k_off can be obtained according to Formula 3 to Formula 5 in normal cases. Then, the CPU 121 calculates the estimates of k_on and k_off according to above-described Formula 5 based on plural combinations of the imaging conditions and the brightness index values D in the imaging histories (S36).

Then, based on k_on and k_off determined in step S36, the CPU 121 calculates an exposure time te and a lighting time tr which satisfy the predetermined constraints and are estimated to realize the target brightness index value D_t, as described above with reference to FIG. 3A to FIG. 4B (S37). Then, the CPU 121 determines the calculated te and tr as the exposure time te and the lighting time tr to be used in the next imaging, and the process returns to the process of FIG. 6.

Next, FIG. 8 shows a flowchart of a process corresponding to the function of the decoding part 156.

When the image data is passed to the decoding part 156 thorough the process of step S26 of FIG. 6, the CPU 121 acquires the image data and starts the process of FIG. 8.

In this process, the CPU 121 first extracts the portion of the code symbol to be decoded from the acquired image data and performs a decoding process on the extracted image data (S41). For this decoding process, a publicly known process may be appropriately adopted in accordance with the standard of the assumed code symbol. Sequential decoding according to multiple standards may be necessary.

When the decoding in step S41 succeeded (Yes in step S42), the CPU 121 notifies the read control part 151 of the success of the decoding and the data of the decoding result (S43), and ends the process. If the decoding failed (No in S42), the process ends skipping step S43.

Since the CPU 121 executes the processes of FIG. 5 to FIG. 8, especially by the processes of FIG. 6 and FIG. 7, the reader 100 can quickly set an imaging condition suitable for the reading being executed and read the code symbol 102 even when a wide range of ambient environments, particularly the brightness, and the reading object 101 are assumed, as described with reference to FIG. 3A to FIG. 4B. Further, the lighting time of the pulsed LED113 does not become unnecessarily long, and thus it is possible to reduce power consumption and glare.

If the decoding succeeds in the state where the number of available imaging histories referred in the process of FIG. 7 is zero or one, it is not necessary to repeat imaging any more, and the reading may be finished before the number of available imaging histories becomes two or more.

Second Embodiment: FIG. 9 and FIG. 10

Next, a second embodiment of the present invention will be described. The second embodiment is different from the first embodiment only in that the reading device 100 distinguishes whether or not the imaging object is a light-emitting body based on the calculated estimates of the exposure contribution degree k_off and the lighting contribution degree k_on, and executes different processes depending on the determination result. Therefore, the description of the portions same as the first embodiment is omitted, and the description will focus on the difference. Elements same as or corresponding to those of the first embodiment are denoted by the same reference numerals.

First, FIG. 9 shows a configuration of functions related to reading of code symbols included in the reader 100.

Functional configuration shown in FIG. 9 is the same as that shown in FIG. 2 except that the imaging object distinguishing part 158 is added.

Imaging object distinguishing part 158 has a function of distinguishing whether or not the imaging object of the imaging sensor 111 is a light-emitting body based on the estimates of k_off and k_on which the imaging condition determining part 154 calculated when determining the imaging condition. Further, imaging object distinguishing part 158 also has a function of changing the constraints of the lighting time tr to be determined by the imaging condition determining part 154 and decoding process performed by the decoding part 156 based on the result of the distinction.

FIG. 10 shows a flowchart of the process corresponding to the functions of the imaging object distinguishing part 158 described above. The process of FIG. 10 is to be inserted between steps S36 and S37 of FIG. 7.

In the reading device 100 of the second embodiment, when the CPU 121 calculates the estimates of k_off and k_on in step S36 of FIG. 7, the process proceeds to step S51 of FIG. 10. In steps S51 and S52, when the exposure contribution degree k_off is larger than a predetermined first threshold T1 and the lighting contribution degree k_on is smaller than a predetermined second threshold T2 (Yes in S52), the CPU 121 determines that the imaging object is a light-emitting body. If either of these conditions is not satisfied (No in S51 or S52), the CPU 121 determines that the imaging object is not a light-emitting body.

As described referring to FIG. 3B in the explanation of the first embodiment, since it can be considered that k_on is small and k_off is somewhat large when attempting to image a light-emitting body, the above criterion is provided in accordance with this concept. When the CPU 121 determines that the imaging object is not a light-emitting body, the CPU 121 switches the decoding part 156 to a general-purpose decoding mode (S53), and sets a lower limit of the lighting period tr as one constraint used in S37 of FIG. 7 (S54). As a result, the lower limit of the lighting time tr is increased as compared with the case of step S56 where there is no setting of the lower limit.

The general-purpose decoding mode is a mode in which the decoding process is performed sequentially for all the possible standards of the code symbol 102 without assuming a particular read object. Further, the reason why the lower limit of tr is set in step S54 is to prevent the exposure time te from becoming unnecessarily long by ensuring a certain degree of lighting time, in consideration that when the imaging object is not a light-emitting body, usually some degree of illumination is necessary, and thus the exposure time te becomes longer and the reading takes a long time when the lighting time tr is too short.

On the other hand, when the CPU 121 determines that the imaging object is a light-emitting body, the CPU 121 switches the decoding part 156 to a decoding mode for smartphones (S55), and sets an upper limit of the lighting time tr as one constraint used in S37 of FIG. 7 (S56). As a result, the upper limit of the lighting time tr is reduced as compared with the case of step S54 where there is no setting of the upper limit.

In this embodiment, a display of a smart phone is assumed as the light-emitting body, also assuming that code symbols of a specific standard are displayed on the smart phone in an environment where the reading device 100 is used. In such an environment, when it can be determined that the imaging object is a light-emitting body, by firstly attempting decoding which targets the specific standard in the decoding process, it is possible to speed-up the decoding process while preventing unnecessary decoding failure due to decodings targeting other standards. The decoding mode for smartphones is a mode in which decoding targeting the specific standard is firstly attempted, in consideration of such an application.

Incidentally, it is conceivable that code symbols of some standard other than that of the code symbols displayed on the smartphones are printed on paper in some environment. In this case, if a mode in which decoding targeting the standard used in the printing on papers is firstly attempted is set as a decoding mode for paper medium instead of the general-purpose decoding mode in step S53, it is possible to speed-up the decoding process similarly to the above.

Further, the reason why the upper limit of tr is set in step S56 is to prevent the lighting time tr from becoming too long, since when the imaging object is a light-emitting body, the illumination usually does not contribute much to increase of brightness of the image, and too long lighting time tr is unfavorable because it leads to an increase in power consumption and glare.

After step S54 or S56, the CPU 121 proceeds to the process of step S37 of FIG. 7, and thereafter performs the same process as in the first embodiment.

As described above, by utilizing the estimates of k_off and k_on, it is possible to distinguish whether or not the imaging object is a light-emitting body in a simple process. In addition, it is possible to perform efficient reading suitable for the reading object or the imaging object by switching the decoding process, changing the imaging conditions used in the next and subsequent imaging, or changing the determination method thereof, according to the result of the distinction.

The process performed in accordance with the result of the distinction of the imaging object is not limited to that shown in FIG. 10, and is arbitrary. It may be a process unrelated to reading or decoding of code symbols. Further, it may be a process assuming some object other than smartphones as a light-emitting body.

In addition, as a criterion for discriminating the imaging object, only one of "exposure contribution degree k_off is larger than the predetermined first threshold T1" and "lighting contribution degree k_on is smaller than the predetermined second threshold T2" may be used. Although the accuracy is lower than that in the case of using both of them as shown in FIG. 10, the distinction is possible to a certain extent based on only one of the above.

Further, since k_off, k_on>0 holds, if k_off>T1 and k_on<T2, then k_off/k_on>T1/T2. Therefore, by adopting T1/T2 as a third threshold T3, the criteria used in steps S51 and S52 of FIG. 10 can also be regarded as determining that the imaging object is a light-emitting body when the ratio of k_off to k_on is larger than the third threshold T3.

Modifications

Although the description of the embodiments is as described above, in the present invention, specific configurations of devices, specific procedures of processing, formats of data, specific contents of data, standards to be adopted, and the like are not limited to those described in the embodiments.

For example, in the above-described embodiments, although tr is defined as lighting time of the pulsed LED 113, pixel values of the image captured by the imaging sensor 111 depends on the time integration value of the amount of light incident on each pixel. Therefore, in accordance with this, tr can also be regarded as a time integration value of the amount of light irradiated by the pulsed LED 113. This time integration value can be considered as "amount of illumination" which is an amount of illumination provided on the read object 101. If the irradiation intensity of the pulsed LED 113 is always constant, the time integration value is proportional to the lighting time, and thus there is no great difference in the calculation for obtaining the value of tr, regardless of in whichever way tr is regarded. However, when tr is regarded as a time integration value, for example, for doubling tr, it is also conceivable to double the light intensity of the pulsed LED 113 instead of doubling the lighting time thereof.

Further, in actual devices, even if a voltage is applied to turn on the pulsed LED 113, the light intensity will not immediately reach the desired level, but the light intensity will gradually increase over a time corresponding to the time constant of the control circuit in general, even though it will not take so long time. In order to reflect this point in the calculation of tr, it is conceivable to regard tr as a time integration value of the amount of light, convert the actual energization time tr_c into the time integration value of intensity of emitted light using characteristic equation of the control circuit of the pulsed LED 113, and calculating values of te and tr for achieving the target value D_t of the brightness index value through the method described with reference to Formula 3 to Formula 5, FIG. 3A to FIG. 4B while regarding the converted value as the lighting time tr in the above-described embodiment. Then, by calculating an energization time tr_x for achieving the time integration value corresponding to the calculated tr using the characteristic equation, and energizing the pulsed LED 113 by the time of tr_x, it is possible to perform an appropriate amount of illumination considering the transient phenomenon.

The read target of the reading device 100 may be information other than the code symbol 102, such as a character string ora mark.

In addition, the present invention is of course applicable to the case where imaging is performed for a purpose other than reading of information. For example, even in a case where it is desired to acquire an image having a particular brightness in order to analyze the image itself obtained by imaging, it is useful to determine the imaging condition in the same manner as in the case of the above-described embodiments.

Further, an embodiment of a computer program of the present invention is a computer program for causing one computer or a plurality of computers to cooperate to control required hardware, to realize the functions of the reading device 100 in the embodiments described above, or to execute the processes described in the embodiments above.

Such a computer program may be stored in a ROM or another non-volatile storage medium (flash memory, EEPROM, or the like) originally included in the computer. The computer program can be provided while being recorded on an arbitrary non-volatile recording medium such as a memory card, a CD, a DVD, a Blu-ray Disc or the like. The computer program can also be downloaded from an external device connected to a network, and installed into and executed by the computer.

Further, the configurations of the above-explained embodiments and modified examples can be embodied in an arbitrary combination unless they are inconsistent with one another and, as a matter of course, can be embodied while taking out only parts of them.

REFERENCE SIGNS LIST

100 . . . reading device, 101 . . . read object, 102 . . . code symbol, 110 . . . optical part, 111 . . . imaging sensor, 112 . . . lens, 113 . . . pulsed LED, 120 . . . control part, 151 . . . reading control part, 152 . . . trigger detecting part, 153 . . . imaging part, 154 . . . imaging condition determining part, 155 . . . imaging history storing part, 156 . . . decoding part, 157 . . . output part, 158 . . . imaging object distinguishing part, 224 . . . solution providing line, 235 . . . perpendicular, D, D1 . . . brightness index value, D_t, D1_t . . . target value of brightness index value, k_off . . . exposure contribution degree, k_on . . . lighting contribution degree, te . . . exposure time of imaging sensor 111, tr . . . lighting time of pulsed LED 113

The invention claimed is:

1. An imaging method of imaging by an imaging device comprising an imager and an illuminator configured to illuminate an imaging object of the imager, the method comprising:

performing respective imagings according to respective imaging conditions each including an exposure time of the imager and an amount of the illumination to the imaging object by the illuminator;

storing respective combinations of brightnesses of respective images obtained by the respective imagings and the imaging conditions of the respective images in a memory, the respective combinations including (i) a first combination of a first brightness of a first image, a first exposure time of the imager, and a first amount of the illumination to the imaging object by the illuminator and (ii) a second combination of a second brightness of a second image, a second exposure time of the imager, and a second amount of the illumination to the imaging object by the illuminator;

obtaining each of an estimate of a first parameter indicating a degree of influence of a variation of the exposure time on brightness of images and an estimate of a second parameter indicating a degree of influence of a variation of the amount of the illumination on the brightness of images based on both of (i) the first combination of the first brightness of the first image, the first exposure time of the imager, and the first amount of the illumination to the imaging object by the illuminator and (ii) the second combination of the second brightness of the second image, the second exposure time of the imager, and the second amount of the illumination to the imaging object by the illuminator; and determining an imaging condition to be used in a next imaging based on the estimate of the first parameter and the estimate of the second parameter.

2. The imaging method according to claim 1,
wherein a lighting time of the illuminator is used as a value indicating the amount of the illumination to the imaging object by the illuminator.

3. The imaging method according to claim 2,
further including determining a relation between the exposure time and the lighting time such that the longer the lighting time is, the shorter the exposure time becomes, and the shorter the lighting time is, the longer the exposure time becomes, based on the estimate of the first parameter and the estimate of the second parameter,
wherein the imaging condition to be used in the next imaging is determined to satisfy the determined relation.

4. The imaging method according to claim 3,
wherein the imaging condition to be used in the next imaging is determined such that the relation between the exposure time and the lighting time is satisfied and a ratio of the lighting time to the exposure time is different from that in latest imaging condition by a predetermined threshold or more.

5. The imaging method according to claim 3,
wherein the imaging condition to be used in the next imaging is determined such that a ratio of the lighting time to the exposure time is as close as possible to a ratio of the estimate of the second parameter to the estimate of the first parameter.

6. A non transitory machine readable storage medium containing program instructions executable by a computer, and when executed, causing one computer or a plurality of computers in cooperation to control the imaging device comprising the imager and the illuminator configured to illuminate the imaging object of the imager to execute the imaging method according to claim 1.

7. An imaging device comprising:
an imager;
an illuminator configured to illuminate an imaging object of the imager;
a controller configured to control the imager and the illuminator according to respective imaging conditions to perform respective imagings each including an exposure time of the imager and an amount of the illumination to the imaging object by the illuminator;
a storer configured to store respective combinations of brightnesses of respective images obtained by the respective imagings and the imaging conditions of the respective images in a memory, the respective combinations including (i) a first combination of a first brightness of a first image, a first exposure time of the imager, and a first amount of the illumination to the imaging object by the illuminator and (ii) a second combination of a second brightness of a second image, a second exposure time of the imager, and a second amount of the illumination to the imaging object by the illuminator; and
an imaging condition determiner configured to obtain each of an estimate of a first parameter indicating a degree of influence of a variation of the exposure time on brightness of images and an estimate of a second parameter indicating a degree of influence of a variation of the amount of the illumination on brightness of images based on both of (i) the first combination of the first brightness of the first image, the first exposure time of the imager, and the first amount of the illumination to the imaging object by the illuminator and (ii) the second combination of the second brightness of the second image, the second exposure time of the imager, and the second amount of the illumination to the imaging object by the illuminator, and to determine an imaging condition to be used in a next imaging by the controller based on the estimate of the first parameter and the estimate of the second parameter.

8. The imaging device according to claim 7,
wherein a lighting time of the illuminator is used as a value indicating the amount of the illumination to the imaging object by the illuminator.

9. The imaging device according to claim 8,
wherein the imaging condition determiner is configured to determine a relation between the exposure time and the lighting time such that the longer the lighting time is, the shorter the exposure time becomes, and the shorter the lighting time is, the longer the exposure time becomes, based on the estimate of the first parameter and the estimate of the second parameter, and determine the imaging condition to be used in the next imaging to satisfy the determined relation.

10. The imaging device according to claim 9,
wherein the imaging condition determiner is configured to determine the imaging condition to be used in the next imaging such that the relation between the exposure time and the lighting time is satisfied and a ratio of the lighting time to the exposure time is different from that in latest imaging condition by a predetermined threshold or more.

11. The imaging device according to claim 9,
wherein the imaging condition determiner is configured to determine the imaging condition to be used in the next imaging such that a ratio of the lighting time to the exposure time is as close as possible to a ratio of the estimate of the second parameter to the estimate of the first parameter.

12. A distinguishing method of distinguishing an imaging object by an imaging device comprising an imager and an illuminator configured to illuminate the imaging object of the imager, the method comprising:
performing respective imagings according to plural imaging conditions each including an exposure time of the imager and amount of the illumination to the imaging object by the illuminator, the respective imaging conditions being different from one another;
storing respective combinations of brightnesses of respective images obtained by the respective imagings and the imaging conditions of the respective images in a memory; and
obtaining an estimate of a first parameter indicating degree of influence of variation of the exposure time on brightness of images and/or an estimate of a second parameter indicating degree of influence of variation of the amount of the illumination on brightness of images based on the combinations of the brightnesses and the imaging conditions stored in the memory; and
determining that the imaging object of the imager is a light-emitting body when a predetermined condition is satisfied, the predetermined condition being any one of:
the estimate of the first parameter is larger than a first threshold;

the estimate of the second parameter is smaller than a second threshold;

the estimate of the first parameter is larger than the first threshold and the estimate of the second parameter is smaller than the second threshold; and a ratio of the estimate of the first parameter to the estimate of the second parameter is larger than a third threshold.

13. The distinguishing method according to claim 12, wherein the obtaining is obtaining the estimate of the first parameter, and the predetermined condition is that the estimate of the first parameter is larger than the first threshold.

14. The distinguishing method according to claim 12, wherein the obtaining is obtaining the estimate of the second parameter, and the predetermined condition is that the estimate of the second parameter is smaller than the second threshold.

15. The distinguishing method according to claim 12, wherein the obtaining is obtaining both the estimate of the first parameter and the estimate of the second parameter, and the predetermined condition is that the estimate of the first parameter is larger than the first threshold and the estimate of the second parameter is smaller than the second threshold.

16. An imaging method comprising:

determining an imaging condition to be used in a next imaging using a smaller upper-limit of the amount of the illumination if the imaging object is determined to be a light-emitting body thorough the distinguishing method according to claim 12 than a case where the imaging object is not determined to be a light-emitting body through the distinguishing method, and using a larger lower-limit of the amount of the illumination if the imaging object is not determined to be a light-emitting body through the distinguishing method than a case where the imaging object is determined to be a light-emitting body through the distinguishing method; and performing an imaging by the imaging device according to the determined imaging condition.

17. A non transitory machine readable storage medium containing program instructions executable by a computer, and when executed, causing one computer or a plurality of computers in cooperation to control the imaging device comprising the imager and the illuminator configured to illuminate the imaging object of the imager to execute the imaging method according to claim 16.

18. A non transitory machine readable storage medium containing program instructions executable by a computer, and when executed, causing one computer or a plurality of computers in cooperation to control the imaging device comprising the imager and the illuminator configured to illuminate the imaging object of the imager to execute the distinguishing method according to claim 12.

19. An imaging device comprising:

an imager;

an illuminator configured to illuminate an imaging object of the imager;

a controller configured to control the imager and the illuminator according to plural imaging conditions each including an exposure time of the imager and amount of the illumination to the imaging object by the illuminator, to perform respective imagings corresponding to the respective imaging conditions, the respective imaging conditions being different from one another;

a storer configured to store respective combinations of brightnesses of respective images obtained by the respective imagings and the imaging conditions of the respective images in a memory; and an imaging object distinguisher configured to:

obtain an estimate of a first parameter indicating degree of influence of variation of the exposure time on brightness of images and/or an estimate of a second parameter indicating degree of influence of variation of the amount of the illumination on brightness of images based on the combinations of the brightnesses and the imaging conditions stored in the memory; and determine that the imaging object of the imager is a light-emitting body when a predetermined condition is satisfied, the predetermined condition being any one of:

the estimate of the first parameter is larger than a first threshold;

the estimate of the second parameter is smaller than a second threshold;

the estimate of the first parameter is larger than the first threshold and the estimate of the second parameter is smaller than the second threshold; and a ratio of the estimate of the first parameter to the estimate of the second parameter is larger than a third threshold.

20. An imaging device according to claim 19, comprising:

an imaging condition determiner configured to determine an imaging condition to be used in a next imaging by the controller, using a smaller upper-limit of the amount of the illumination if the imaging object distinguisher determines that the imaging object of the imager is a light-emitting body than a case where the imaging object distinguisher does not determine that the imaging object of the imager is a light-emitting body, and using a larger lower-limit of the amount of the illumination if the imaging object distinguisher does not determine that the imaging object of the imager is a light-emitting body than a case where the imaging object distinguisher determines that the imaging object of the imager is a light-emitting body.

\* \* \* \* \*